S. NEWCOMB.
VEHICLE-SPRING.

No. 172,763. Patented Jan. 25, 1876.

WITNESSES:
C. Neveux
A. F. Roberts

INVENTOR:
S. Newcomb
BY
ATTORNEYS.

UNITED STATES PATENT OFFICE.

SILAS NEWCOMB, OF PIKE, NEW YORK.

IMPROVEMENT IN VEHICLE-SPRINGS.

Specification forming part of Letters Patent No. 172,763, dated January 25, 1876; application filed November 6, 1875.

*To all whom it may concern:*

Figure 1:
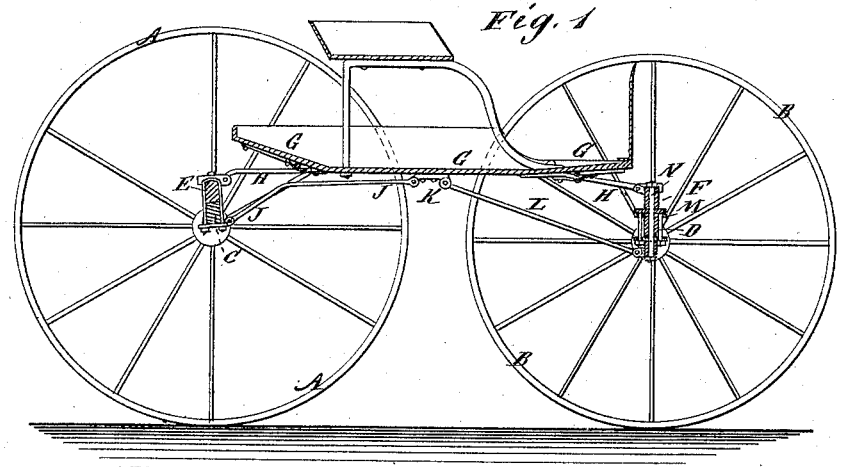
Figure 2:
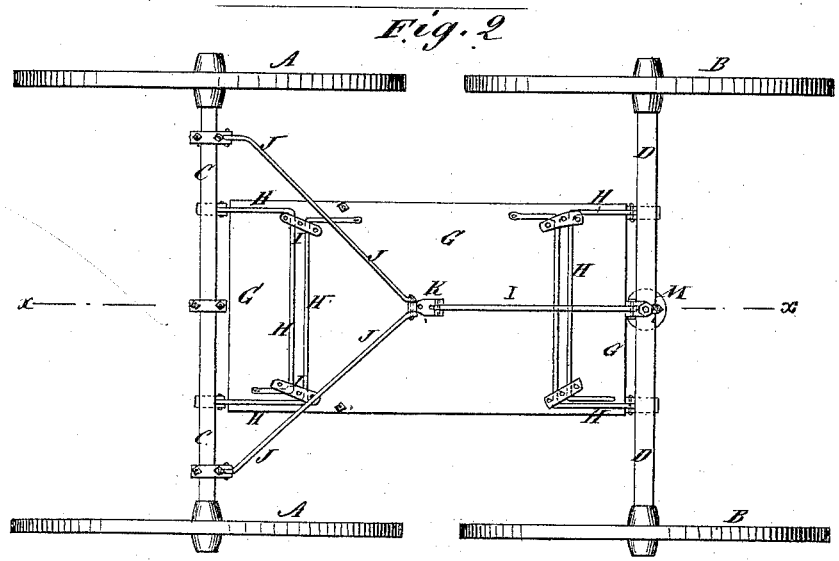
Figure 3:
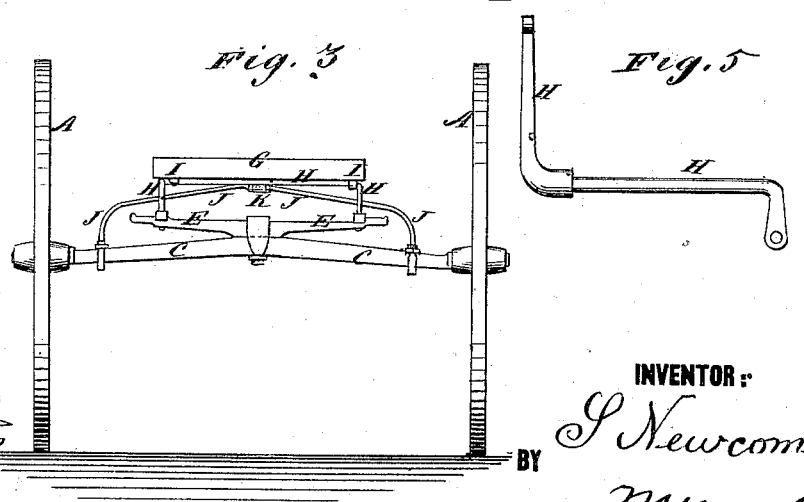
Figure 5:
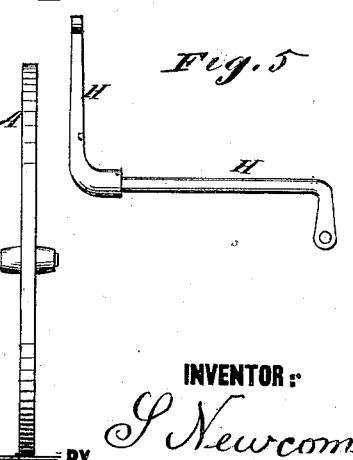

Be it known that I, SILAS NEWCOMB, of Pike, Wyoming county, New York, have invented a new and useful Improvement in Wagons, of which the following is a specification:

Figure 1 is a vertical longitudinal section of a buggy to which my improvement has been applied, taken through the line $x\ x$, Fig. 2; Fig. 2 is a bottom view of the same; Fig. 3 is a rear view of the same; Fig. 5 is a detail view of the torsion-springs.

Similar letters of reference indicate corresponding parts.

The invention relates to an improvement in the class of wagons unprovided with a reach, and consists in combining rearward-extended torsion-springs, and pivoted or hinged stay-bars, with the body of the wagon, as hereinafter fully described.

A are the rear wheels; B are the forward wheels; C is the rear axle; D is the forward axle; E is the rear spring-bar; F is the forward spring-bar, or head-block; and G is the body or box; H are two pairs of torsion-springs, the bodies of which cross the front and rear parts of the bottom of the body G, and are secured to said bottom by keepers I.

The springs H are bent twice at right angles to form arms upon their ends.

The arms at the alternate ends of the springs H are secured to the bottom of the body G near its sides, and the other arms project at the ends of the body G.

The projecting ends of the rear springs H are pivoted or hinged to the spring-bar E or axle C, and the projecting ends of the forward springs are pivoted or hinged to the spring-bar F.

The springs H are enlarged at the angle of their projecting arms, to strengthen them at these points, where the strain and wear are greatest.

J are the rear stays, the rear ends of which are rigidly attached, or with a joint, to the end parts of the rear axle C.

The forward ends of the rear stays J are pivoted or hinged to a plate, K, attached to the middle part of the bottom of the body G.

When the wagon-body is depressed, the projecting arms of springs G are brought down to a horizontal plane, or thereabout, which has practically the effect to increase their length. The same is true of the stay-bars J. The rear axle is therefore separated or moved away from the wagon-body to the extent of such increase in the size of the arcs of which said springs and stay-rods are radii. These arcs so far correspond, that the axle is maintained in a practically vertical plane, and hence the bolt-connections between it and the springs are not strained at each vertical vibration of the wagon-body, whereby they would be sooner or later broken, as in other vehicles of this class.

To the same plate K is pivoted or hinged the rear end of the forward stay L, the forward end of which is connected with the center of the forward axle D, or to the clip that secures the kingbolt-plate M to said axle. N is the kingbolt, which is formed solid with the plate M, and passes up through the spring-bar or head-block F.

With this construction no fifth-wheel will be required.

The torsion-springs H may be applied to a wagon provided with a reach, but in this case the projecting ends of said springs should be connected with their supports by links.

Having thus described my invention, I claim as new and desire to secure by Letters Patent—

The combination, with the wagon-body and axle, of the torsion-springs H, having rearward-extended parallel arms, and the hinged stay-bars J, as shown and described, to operate as specified.

SILAS NEWCOMB.

Witnesses:
 EDWIN F. NEWCOMB,
 WALLACE SPENCER.